United States Patent
Yazu et al.

(10) Patent No.: US 11,127,396 B2
(45) Date of Patent: Sep. 21, 2021

(54) SOUND ACQUISITION DEVICE, COMPUTER-READABLE STORAGE MEDIUM AND SOUND ACQUISITION METHOD

(71) Applicants: Oki Electric Industry Co., Ltd., Tokyo (JP); FEAT Limited, Tokyo (JP)

(72) Inventors: Takashi Yazu, Tokyo (JP); Kazuhiro Katagiri, Tokyo (JP); Akihiko Arimitsu, Tokyo (JP)

(73) Assignees: Oki Electric Industry Co., Ltd., Tokyo (JP); FEAT Limited, Tokyo (JP)

( * ) Notice: Subject to any disclaimer, the term of this patent is extended or adjusted under 35 U.S.C. 154(b) by 165 days.

(21) Appl. No.: 16/513,920

(22) Filed: Jul. 17, 2019

(65) Prior Publication Data

US 2020/0105253 A1    Apr. 2, 2020

(30) Foreign Application Priority Data

Sep. 28, 2018 (JP) .............................. JP2018-183817

(51) Int. Cl.
*G10L 15/20* (2006.01)
*H04R 1/40* (2006.01)
(Continued)

(52) U.S. Cl.
CPC .............. *G10L 15/20* (2013.01); *G10L 15/22* (2013.01); *G10L 25/84* (2013.01); *H04R 1/406* (2013.01); *H04R 3/005* (2013.01); *H04R 3/04* (2013.01)

(58) Field of Classification Search
CPC ......... G10L 15/20; G10L 15/22; G10L 25/84; G10L 21/0208; G10L 2021/02166;
(Continued)

(56) References Cited

U.S. PATENT DOCUMENTS

2009/0141907 A1* 6/2009 Kim ..................... G10L 21/0208
                                                                                 381/71.7
2013/0073283 A1* 3/2013 Yamabe .............. G10L 21/0216
                                                                                 704/226

FOREIGN PATENT DOCUMENTS

JP    2014-072708 A    4/2014
JP    2017-183902 A    10/2017
JP    2018056902 A  *  4/2018

OTHER PUBLICATIONS

"Acoustic Technology Series 16: Array Signal Processing of Sound-Sound Source Localization, Tracking and Separation-" by Futoshi Asano, The Acoustical Society of Japan, published Feb. 25, 2011, Corona Publishing Co. Ltd.

* cited by examiner

*Primary Examiner* — Yogeshkumar Patel
(74) *Attorney, Agent, or Firm* — Rabin & Berdo, P.C.

(57) ABSTRACT

There are provided a target area sound extraction unit that, based on input signals input from plural microphone arrays, acquires beam former outputs from each of the microphone arrays, and uses the acquired beam former outputs to perform target area sound extraction processing to extract a target area sound taking a target area as a sound source, so as to thereby acquire an area sound acquisition output, and a restoration device that restores components of the target area sound in a frequency bandwidth having a predetermined range that was suppressed in the target area sound extraction processing.

12 Claims, 8 Drawing Sheets

(51) Int. Cl.
*G10L 15/22* (2006.01)
*H04R 3/04* (2006.01)
*G10L 25/84* (2013.01)
*H04R 3/00* (2006.01)

(58) Field of Classification Search
CPC . G10L 21/0232; G10L 21/0216; G10L 25/78; G10L 25/87; H04R 1/406; H04R 3/005; H04R 3/04; H04R 2430/20; H04R 2430/03; H04R 2430/23
See application file for complete search history.

SOUND ACQUISITION DEVICE, COMPUTER-READABLE STORAGE MEDIUM AND SOUND ACQUISITION METHOD

CROSS-REFERENCE TO RELATED APPLICATION

This application is based on and claims priority under 35 USC 119 from Japanese Patent Application No. 2018-183817 filed on Sep. 28, 2018, the disclosure of which is incorporated by reference herein.

BACKGROUND

Technical Field

This disclosure relates to a sound acquisition device, a computer-readable storage medium storing a sound acquisition program, and a sound acquisition method, and is able to be applied, for example, to a speech recognition system that is used in a noise environment, and to a system that emphasizes a sound in a specific area, while suppressing noise from outside that area.

Related Art

When a speech communication system or a speech recognition application system is used in a noise environment, peripheral noise that is simultaneously mixed with required target speech is an obstruction to good communication, and is a troublesome presence that leads to a reduction in speech recognition efficiency. Conventionally, in an environment where plural noise sources such as these are present, technology in the form of a beamformer (this may be referred to below simply as a BF) employing a microphone array exists that, by separating and acquiring only sound from a specific direction, enables the mixing of non-required noise to be avoided, and enables the required target sound to be obtained. BF is technology (see "Acoustic Technology Series 16: Array Signal Processing of Sound—Sound Source Localization, Tracking and Separation-" by Futoshi ASANO, The Acoustical Society of Japan, published Feb. 25, 2011, Corona Publishing Co. Ltd. (Non-Patent Document 1)) in which directionality is established by using time differences between signals arriving at each microphone in a microphone array which is created using plural microphones. BF can be broadly classified into two types, namely, additive BF and subtractive BF. Subtractive BF, in particular, compared to additive BF, has the advantage of enabling directionality to be created using a smaller number of microphones.

Figure 6:
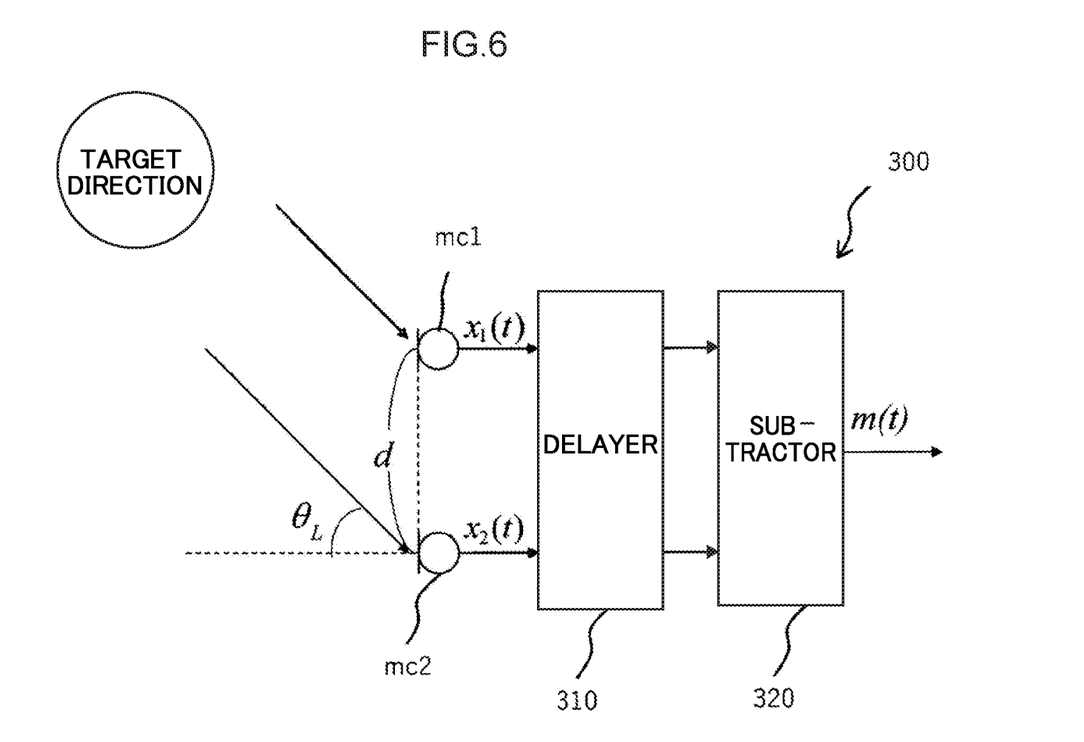
FIG. 6 is a block diagram showing a structure of a conventional subtractive BF (in which the number of microphones is two)

FIG. 6 is a block drawing showing a structure according to a subtractive BF 300 in which the number of conventional microphones used is two (i.e., microphones mc1 and mc2).

Figure 7:
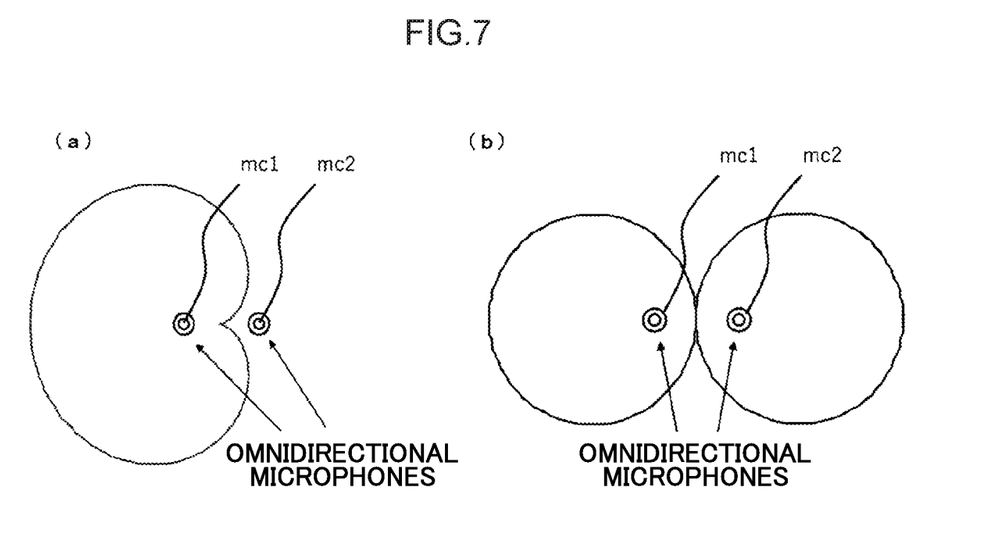
FIG. 7 is an explanatory view showing an example of a directional filter formed by a conventional subtractive BF (in which the number of microphones is two)

FIG. 7 is a view showing directional characteristics created by the subtractive BF 300 using the two microphones mc1 and mc2.

The subtractive BF 300 shown in FIG. 6 has a delayer 310 and a subtractor 320.

The subtractive BF 300 firstly uses the delayer 310 to calculate a time difference between when a signal which is generated by a sound present in a target direction (hereinafter, referred to as a 'target sound') arrives at each microphone, and then matches the phases of the target sound by adding a delay thereto. The time difference is calculated using the following Formula (1). Here, [d] is the distance between the microphones, [c] is the speed of sound, and [$\tau_i$] is the delay amount. In addition, [$\theta_L$] is an angle between a perpendicular direction relative to a straight line connecting the two microphones (mc1 and mc2) and the target direction.

$$\tau_L = (d \sin \theta_L)/c \tag{1}$$

Here, when a blind spot relative to the center between the microphone mc1 and the microphone mc2 exists in the direction of the microphone mc1, the delayer 310 performs delay processing on an input signal $x_1(t)$ in the microphone mc1, and thereafter, in the subtractive BF 300, the subtractor 320 performs subtraction processing in accordance with Formula (2).

$$m(t) = x_2(t) - x_1(t - \tau_L) \tag{2}$$

In the subtractor 320, subtraction processing can be performed in the same way in the frequency region, and in this case, Formula (2) is altered in the manner shown by Formula (3).

[Equation 1]

$$M(\omega) = X_2(\omega) - e^{-j\omega \tau_L} X_1(\omega) \tag{3}$$

Here, when $\theta_L = \pm\pi/2$, then, as is shown in FIG. 7 (a), the directionality formed by the subtractor 320 is a cardioid type of unidirectionality, while when $\theta_L = 0, \pi$, then, as is shown in FIG. 7 (b), the directionality formed by the subtractor 320 is a figure-8 type of bidirectionality. Here, a filter that forms unidirectionality from the input signal is called a unidirectional filter, while a filter that forms bidirectionality from the input signal is called a bidirectional filter.

Moreover, in the subtractor 320, by using spectral subtraction (may be referred to below simply as 'SS'), it is also possible to form strong directionality in a bidirectionality blind spot. The directionality obtained from SS is formed, in accordance with Formula (4), in all frequencies, or in a specified frequency bandwidth. In Formula (4), the input signal $X_1$ of the microphone mc1 is used, however, a similar type of effect can also be obtained using the input signal $X_2$ of the microphone mc2. Here, β is a coefficient used to adjust the SS intensity.

In the subtractor 320, if the value during the subtraction processing becomes negative, then processing (i.e., flooring processing) to replace this negative value with 0 or with a value obtained by reducing the original value is performed. Using this method, the subtractor 320 is able to extract noise present outside the target direction (hereinafter, referred to as 'non-target noise') using a bidirectional filter. By then subtracting the amplitude spectrum of the extracted non-target noise from the amplitude spectrum of the input signal, the subtractor 320 is able to emphasize the target sound.

$$Y(n) = X_1(n) - \beta M(n) \tag{4}$$

If there is a desire to acquire only a sound from within a specific area (hereinafter, referred to as 'target area sound'), then if subtractive BF is the only method employed, there is a possibility that noise from noise sources present on the periphery of that area (hereinafter, referred to as 'non-target area noise') may also be acquired. For this reason, in the technology described in Japanese Unexamined Patent Application (JP-A) No. 2014-072708 (Patent Document 1), there is proposed a method in which, using plural microphone arrays, directionality is directed towards the target area from various mutually different directions, and these directionalities are made to intersect in the target area, thereby enabling the target area sound to be acquired (hereinafter, referred to as 'area sound acquisition).

The conventional area sound acquisition processing described in Patent Document 1 will now be described.

Figure 8:
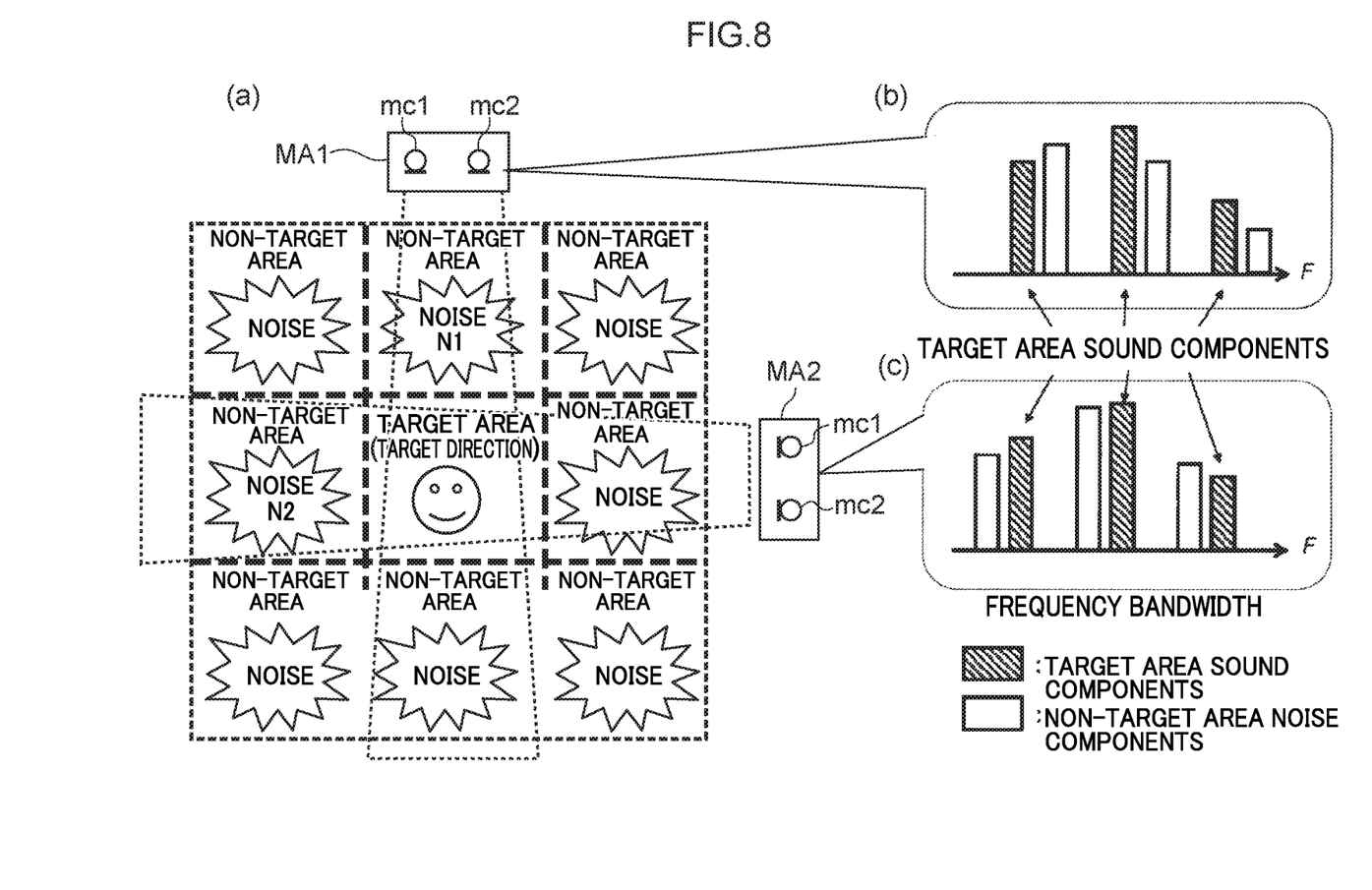
FIG. 8 is an explanatory view showing an example of a structure in which directionality provided by beam formers (BF) of two microphone arrays is directed towards a target area from mutually different directions in a conventional sound acquisition device.

FIG. 8 is an explanatory view showing processing to acquire target area sound from a sound source in a target area using two microphone arrays MA1 and MA2.

FIG. 8 (a) is an explanatory view showing an example of the structure of each microphone array. FIG. 8 (b) and FIG. 8 (c) are graphs (i.e., image diagrams) in which the BF outputs of the respective microphone arrays MA1 and MA2 shown in FIG. 8 (a) are shown in frequency regions.

As is shown in FIG. 8 (a), sound is acquired by causing the directionalities of the microphone arrays MA1 and MA2 to intersect from mutually different directions in an area where sound acquisition is desired (i.e., in the target area). In the state shown in FIG. 8 (a), noise (i.e., non-target area noise) from the target area direction is contained in the directionalities of the respective microphone arrays MA1 and MA2 in addition to the sound present within the target area (i.e., the target area sound). However, as is shown in FIG. 8 (b) and FIG. 8 (c), if the directionalities of the microphone arrays MA1 and MA2 are compared by frequency region, then although target area sound components are contained in each output, non-target area noise components are different in each microphone array. Using this characteristic, by suppressing all components other than those that are common to both BF outputs from the two microphone arrays MA1 and MA2, it is possible to extract the target area sound exclusively.

Firstly, a ratio between the amplitude spectra of the target area sounds contained in each microphone array BF output is estimated, and the result is used as a correction coefficient. As an example, in cases in which two microphone arrays are employed, the correction coefficient for the target area sound amplitude spectrum may be calculated using Formulas (5) and (6), or Formulas (7) and (8).

[Equation 2]

$$\alpha_1(n) = \mathrm{mode}\left(\frac{Y_{2k}(n)}{Y_{1k}(n)}\right) k = 1, 2, \ldots, N \quad (5)$$

$$\alpha_2(n) = \mathrm{mode}\left(\frac{Y_{1k}(n)}{Y_{2k}(n)}\right) k = 1, 2, \ldots, N \quad (6)$$

$$\alpha_1(n) = \mathrm{median}\left(\frac{Y_{2k}(n)}{Y_{1k}(n)}\right) k = 1, 2, \ldots, N \quad (7)$$

$$\alpha_2(n) = \mathrm{median}\left(\frac{Y_{1k}(n)}{Y_{2k}(n)}\right) k = 1, 2, \ldots, N \quad (8)$$

Here, [$Y_{1k}$ (n)] and [$Y_{2k}$ (n)] are amplitude spectra of the BF output of the respective microphone arrays MA1 and MA2, [N] is the total number of frequency bins, [k] is the frequency, and [$\alpha_1$ (n)] and [$\alpha_2$ (n)] are amplitude spectrum correction coefficients for the respective BF outputs. In addition, [mode] shows the mode value, and [median] shows the median value.

Next, by correcting the respective BF outputs using the correction coefficient, and performing SS thereon, the non-target area noise present in a target area direction is extracted. Furthermore, by performing SS to subtract the extracted non-target area noise from the respective BF outputs, the target area sound can be extracted.

In accordance with Formula (9), a value is obtained by multiplying the amplitude spectrum correction coefficient $\alpha_2$ by the BF output $Y_2$ (n) from the microphone array MA2. SS processing is then performed to subtract this value from the BF output $Y_1$ (n) from the microphone array MA1. Non-target area noise $N_1$ (n) present in the target area direction as seen from the microphone array MA1 can then be extracted. In the same way, in Patent Document 1, in accordance with Formula (10), non-target area noise $N_2$ (n) present in the target area direction as seen from the microphone array MA2 can also be extracted.

$$N_1(n) = Y_1(n) - \alpha_2(n)Y_2(n) \quad (9)$$

$$N_2(n) = Y_2(n) - \alpha_1(n)Y_1(n) \quad (10)$$

Thereafter, in accordance with Formulas (11) and (12), SS processing to subtract non-target area noise from the respective BF outputs is performed enabling target area sound to be extracted. Formula (11) shows processing to extract target area sound using the microphone array MA1 as a reference. Similarly, Formula (12) shows processing to extract target area sound using the microphone array MA2 as a reference.

Here, [$\gamma_1$ (n)] and [$\gamma_2$ (n)] are coefficients used to alter (i.e., correct) the intensities during the respective SS processing.

$$Z_1(n) = Y_1(n) - \gamma_1(n)N_1(n) \quad (11)$$

$$Z_2(n) = Y_2(n) - \gamma_2(n)N_2(n) \quad (12)$$

When the noise level of background noise and non-target area noise is high, there is a possibility of target area sound being distorted by the SS processing performed when the target area sound is being extracted, and there is a possibility of harsh and abnormal noise such as musical noise being generated.

Therefore, in the area sound acquisition processing described in Japanese Unexamined Patent Application (JP-A) No. 2017-183902 (Patent Document 2), the noise levels of the microphone input signal and the estimated noise are respectively adjusted in accordance with the levels of the background noise and the non-target area noise, and are then mixed with extracted target area sound.

Musical noise generated by the processing to extract the target area sound intensifies proportionally as the noise level of background noise and non-target area noise increases. Because of this, the total noise level of the input signal being mixed and estimated noise also increases in proportion with the noise level of background noise and non-target area noise. The noise level of the background noise may be calculated from the estimated noise determined during the procedure to suppress background noise. Moreover, the noise level of the non-target area noise may be calculated from a value obtained by combining the non-target area noise present in a target area direction which was extracted during the procedure to emphasize the target area sound, with the non-target area noise present outside the target area direction. Furthermore, the ratio between the input signal being mixed and the estimated noise is determined from the noise levels of the estimated noise and the non-target area noise. If non-target area noise is present close to the target area, then if the noise level of the input signal being mixed is too high, this non-target area noise blends into the target area sound, and it becomes difficult to ascertain which one is the actual target area sound. For this reason, when the non-target area noise level is high, the noise level of the input signal being mixed is lowered, while the noise level of the estimated noise is raised and the estimated noise is then mixed. In other words, if there is no non-target area noise, or if the noise level thereof is low, the proportion of the input signal is increased, while conversely, if the noise level of non-target area noise is high, the proportion of the estimated noise is increased and the estimated noise is then mixed.

As is described above, if the area sound acquisition processing of Patent Document 2 is applied, then musical noise can be masked by mixing the input signal and estimated noise with the target area noise, and the resulting sound can be listened to in the same way as normal background noise without any unpleasant sensation. Additionally, distortion in the target area sound can be corrected using components of the target area sound contained in the microphone input signal, so that the noise quality can be improved.

However, the method for area sound acquisition and BF and the like described in Patent Document 1 enables background noise to be suppressed and speech clarity to be improved, however, since the frequency characteristics are changed by signal processing, there is no guarantee that the speech recognition rate will be improved. In contrast, the mixing method described in Patent Document 2 is also effective in reducing musical noise, and improving audible sound quality (i.e., the sound quality as listened to by a person), however, this method has the drawback that suppressed noise ends up being restored, and this does not lead to an improvement in speech recognition accuracy.

SUMMARY

Because of this, a sound acquisition device, a computer-readable storage medium storing a sound acquisition program, and a sound acquisition method are desired that enable the speech recognition accuracy of speech recognition processing to be improved.

A sound acquisition device according to a first aspect includes (1) a target area sound extraction unit that, based on input signals input from plural microphone arrays, acquires beam former outputs from each of the microphone arrays, and uses the acquired beam former outputs to perform target area sound extraction processing to extract a target area sound taking a target area as a sound source, so as to thereby acquire an area sound acquisition output, and (2) a restoration device that restores components of the target area sound in a frequency bandwidth having a predetermined range that was suppressed in the target area sound extraction processing.

A sound acquisition program according to a second aspect causes (1) a computer to function as (2) a target area sound extraction unit that, based on input signals input from plural microphone arrays, acquires beam former outputs from each of the microphone arrays, and uses the acquired beam former outputs to perform target area sound extraction processing to extract a target area sound taking a target area as a sound source, so as to thereby acquire an area sound acquisition output, and (3) a restoration device that restores components of the target area sound in a frequency bandwidth having a predetermined range that was suppressed in the target area sound extraction processing.

A third aspect of the present disclosure is characterized in that, in the sound acquisition method performed by a sound acquisition device, (1) there is provided a target area sound extraction unit and a restoration device, and (2), based on input signals input from plural microphone arrays, the target area sound extraction device acquires beam former outputs from each of the microphone arrays, and uses the acquired beam former outputs to perform target area sound extraction processing to extract a target area sound taking a target area as a sound source, so as to thereby acquire an area sound acquisition output, and (3) the restoration device restores components of the target area sound in a frequency bandwidth having a predetermined range that was suppressed in the target area sound extraction processing.

According to the present disclosure, it is possible to obtain area sound acquisition results that enable the speech recognition accuracy of speech recognition processing to be improved.

BRIEF DESCRIPTION OF THE DRAWINGS

Exemplary embodiments of the present disclosure will be described in detail based on the following figures, wherein.

DETAILED DESCRIPTION

(A) First Exemplary Embodiment

Hereinafter, a first exemplary embodiment of a sound acquisition device, program, and method according to the present disclosure will be described in detail with reference to the drawings.

(A-1) Structure of the First Exemplary Embodiment

Figure 1:
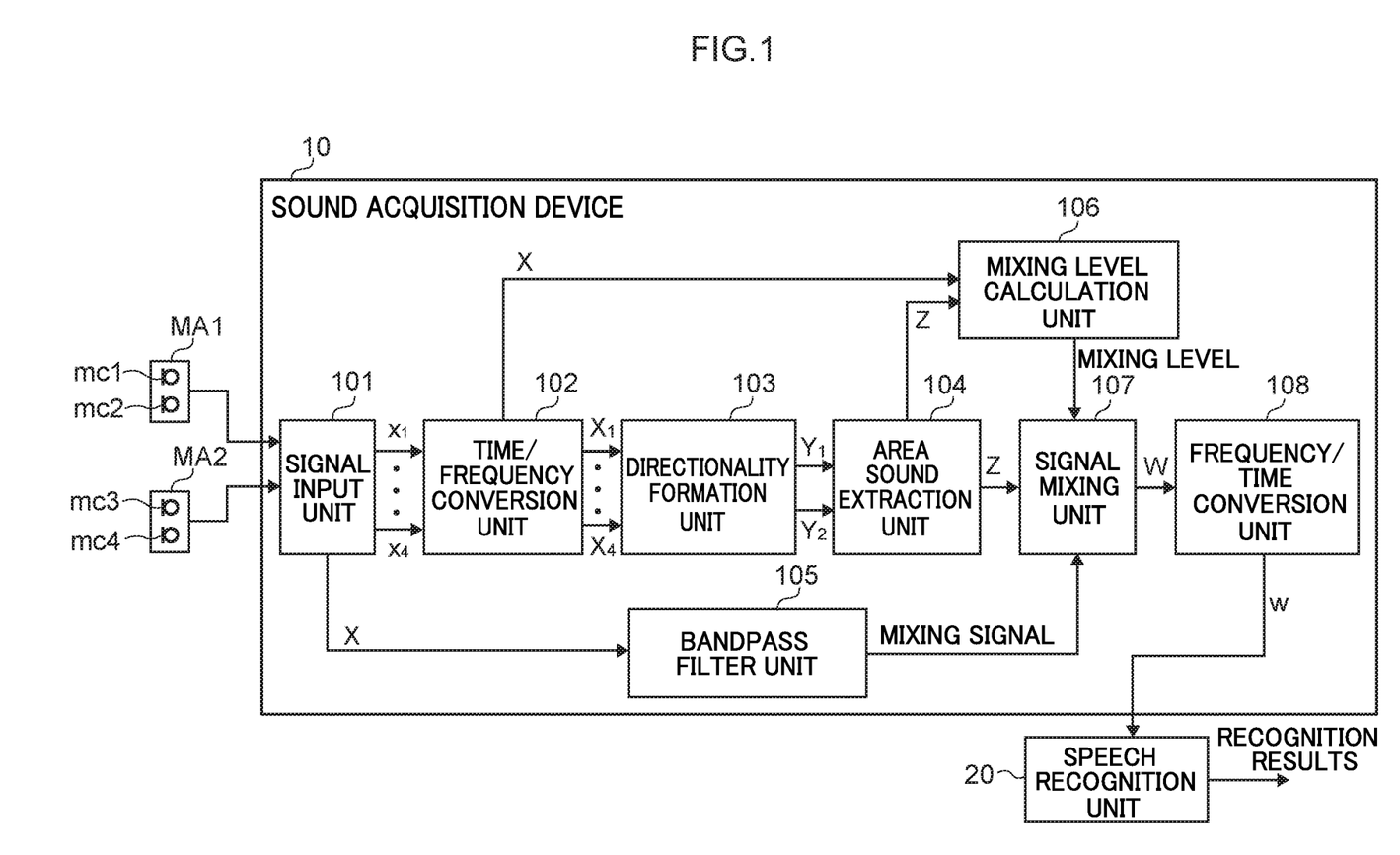
FIG. 1 is a block diagram showing a connection structure of each device and a functional structure of a sound acquisition device according to a first exemplary embodiment.

A sound acquisition device 10 performs target area sound acquisition processing to acquire a target area sound from a sound source in a target area using two microphone arrays MA (MA1 and MA2).

An output signal (i.e. a result of target area sound acquisition processing) w acquired by the sound acquisition device 10 of the present exemplary embodiment is supplied to a speech recognition device 20. The speech recognition device 20 is a device that performs processing including speech recognition processing based on these supplied speech signals.

The microphone arrays MA1 and MA2 are disposed in any desired location of a space where a target area is present. The positions of the microphone arrays MA1 and MA2 relative to the target area may be set to any desired position provided that their directionalities only overlap each other within the target area. For example, the microphone arrays MA1 and MA2 may be disposed opposite each other on either side of the target area. Each microphone array MA is formed by two or more microphones mc, and acoustic signals are acquired by each microphone mc. In this exemplary embodiment, a description is given of a structure in which two microphones mc, which each acquire acoustic signals, are disposed in each microphone array MA. In other words, each microphone array MA is formed as a two-channel microphone array. Note that the number of microphone arrays MA is not limited to two. For example, if there are plural target areas, then it is necessary to deploy a sufficient number of microphone arrays MA to cover all the areas. In this exemplary embodiment, in each of the microphone arrays MA1 and MA2, the distance between the microphones mc may be set, for example, to 3 cm.

Hereinafter, a description is given of a structure in which the microphone array MA1 has two microphones mc1 and mc2, and the microphone array MA2 has two microphones mc3 and mc4.

Next, an internal structure of the sound acquisition device 10 will be described.

The sound acquisition device 10 has a signal input unit 101, a time/frequency conversion unit 102, a directionality formation unit 103, an area sound extraction unit 104, a bandpass filter unit 105, a mixing level calculation unit 106, a signal mixing unit 107, and a frequency/time conversion unit 108. The processing performed by each function block making up the sound acquisition device 10 is described below in detail.

The sound acquisition device 10 of the first exemplary embodiment has a restoration device that restores components of speech (i.e., target area sound) that have been attenuated by the target area sound extraction processing, and this restoration device is formed by the bandpass filter 105, the mixing level calculation unit 106, and the signal mixing unit 107.

The sound acquisition device 10 may be formed entirely by hardware (for example, by a dedicated chip or the like), or the functions thereof may be achieved either partially or entirely by means of software (i.e., using a computer program). In this case, the sound acquisition device 10 may be formed, for example, by installing programs (including the determination program and sound acquisition program of the exemplary embodiments) on a computer having a processor and memory.

Figure 2:
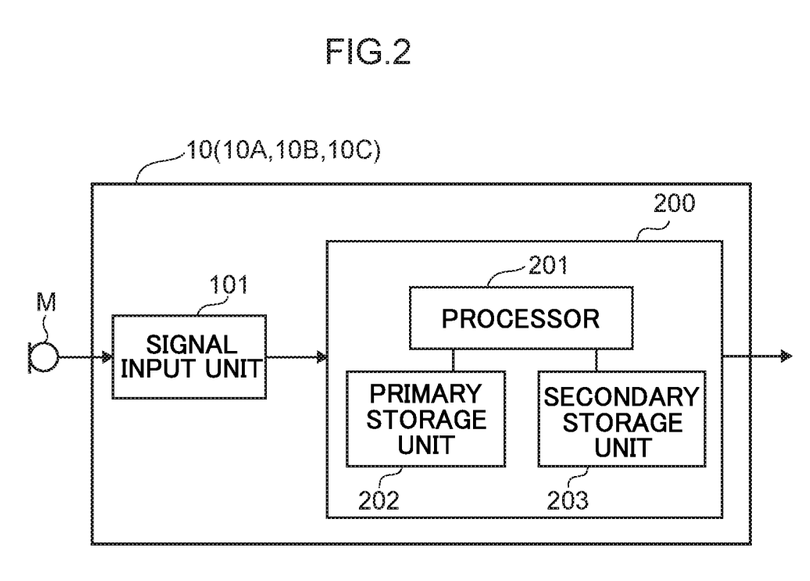
FIG. 2 is a block diagram showing a connection structure of each device and a hardware structure of a sound acquisition device according to the first through fourth exemplary embodiments.

FIG. 2 is a block diagram showing an example of the hardware structure of the sound acquisition device 10. Note that symbols inside the parentheses in FIG. 2 are used in the second through fourth exemplary embodiments described below.

In FIG. 2, an example is shown in which the sound acquisition device 10 is formed using software (i.e., a computer).

The sound acquisition device 10 shown in FIG. 2 has hardware component elements in the form of at least a signal input unit 101, and a computer 200 on which are installed programs (i.e., programs that include the sound acquisition program of the exemplary embodiments).

The signal input unit 101 can be formed, for example, using an A/D converter. Note that it is sufficient for the A/D converter to be installed in the computer 200 itself, and there is no need for the signal input unit 101 to be separately provided.

The computer 200 performs processing in order to implement area sound acquisition processing on an acoustic signal (i.e., a digital acoustic signal) supplied from the signal input unit 101, and then output the result. In this exemplary embodiment, programs (i.e., software) including the sound acquisition program of this exemplary embodiment are installed on the computer 200.

Note that the computer 200 may be a dedicated computer on which only the sound acquisition program is installed, or may be a computer on which programs for implementing other functions (for example, functions of the speech recognition device 20) are also installed.

The computer 200 shown in FIG. 2 has a processor 201, a primary storage unit 202, and a secondary storage unit 203. The primary storage unit 202 is a storage device that functions as working memory for the processor 201, and may be formed, for example, by memory that operates at high-speed such as DRAM (Dynamic Random Access Memory). The secondary storage unit 203 is a storage device that records various types of data such as an OS (Operating System) and program data (including data for the sound acquisition program according to the exemplary embodiments), and may be formed, for example, by non-volatile memory such as Flash memory or an HDD or the like. In the computer 200 of the present exemplary embodiment, when the processor 201 is booted up, the OS and programs (including the sound acquisition program according to the exemplary embodiments) recorded in the secondary storage unit 203 are read, and then executed after being expanded in the primary storage unit 202.

Note that the specific structure of the computer 200 is not limited to the structure shown in FIG. 2, and various types of structures may be employed. For example, if the primary storage unit 202 is also formed by non-volatile memory (for example, Flash memory or the like), then the secondary memory may be omitted from the structure.

(A-2) Operation of the First Exemplary Embodiment

Next, an operation of the sound acquisition device 10 of the first exemplary embodiment having the above-described structure will be described.

The signal input unit 101 converts acoustic signals acquired by the four microphones mc1 through mc4 from analog signals into digital signals. Hereinafter, the digital signals (i.e., the time-region digital signals) that are based on the acoustic signals acquired by the microphones mc1 through mc4 are referred to respectively as x1 through x4. The signal input unit 101 supplies the input signals x1 through x4 to the time/frequency conversion unit 102.

Using the respective input signals X1 through X4 resulting from a time/frequency conversion performed by the time/frequency conversion unit 102, the directionality formation unit 103 forms directionality from the BF in accordance with Formula (3) and Formula (4). Hereinafter, the BF output obtained by the microphone array MA1 is referred to as 'Y1', while the BF output obtained by the microphone array MA2 is referred to as 'Y2'.

Using the BF outputs Y1 and Y2 created by the directionality formation unit 103, the area sound extraction unit 104 performs SS processing in accordance with Formula (10), and extracts non-target area noise present in the target area direction. Next, the area sound extraction unit 104 extracts target area sound by performing SS processing to subtract the extracted noise from the respective BF outputs in accordance with Formula (10) or Formula (11). In actuality, in the area sound extraction unit 104, in each sound extraction, it is necessary to estimate the ratio between the amplitude spectra of the target area sounds contained in the BF outputs Y1 and Y2 of the respective microphone arrays MA1 and MA2 using [Formula (5) and Formula (6)] or using [Formula (7) and Formula (8)], and to then perform processing or the like to convert this into a correction coefficient. Because the method used to determine the correction coefficient employs the same type of processing as existing area sound acquisition processing, a detailed description thereof is omitted from the present specification.

In the sound acquisition device 10, as a result of the area sound acquisition processing performed up to this point (i.e., the processing as far as the area sound extraction unit 104), only the target area sound generated in a target area in which a target sound is present is extracted. Consequently, even if noise that is not required for speech recognition is peripherally present, it is possible to extract only the target sound (i.e., the speech required by the speech recognition device 20). However, in the sound acquisition device 10, in the steps of the area sound acquisition processing performed up to this point, there are cases in which the frequency characteristics of the original speech signal (i.e., the frequency characteristics of the actual speech itself emitted from the target area) become transformed. In particular, when conventional area sound acquisition processing is performed, there is a tendency for low frequency bandwidths (for example, frequency bandwidths of 1 kHz or less) in the area sound acquisition output (i.e., in the area sound acquisition results) to be suppressed. Conventional area sound acquisition processing has the characteristic that, above all, low frequency bandwidths containing essential components for speech recognition such as first formants and the like are suppressed, and this is a main factor in causing the speech recognition rate to be reduced. Because of this, even if a target sound signal (i.e., an area sound collection output) extracted using conventional area sound acquisition processing is supplied unmodified to the speech recognition device 20, there is a possibility that a high recognition rate will be unachievable.

Therefore, in the sound acquisition device 10 of this exemplary embodiment, a signal (hereinafter, referred to as a 'mixing signal') obtained when components of frequency bandwidths that have been suppressed by the area sound acquisition processing have been extracted from the input signal X (for example, any one of X1 through X4) is mixed with the area sound acquisition output Z, thereby enabling components of suppressed bandwidths to be corrected and restored.

In the bandpass filter unit 105, using a bandpass filter that enables a frequency bandwidth suppressed by the area sound acquisition processing (i.e., the processing as far as the area sound extraction unit 104) (hereinafter, this may be referred to as a 'suppressed frequency bandwidth') to pass through, a signal obtained when a suppressed frequency bandwidth (i.e. components of a suppressed frequency bandwidth present in the original signal) has been allowed to pass is acquired from the input signal X as the mixing signal. Hereinafter, a frequency bandwidth allowed to pass by the bandpass filter 105 may also be referred to as a 'passband'.

As has been described above, because the conventional area sound acquisition processing has the characteristic that components of 1 kHz or less are suppressed, in the bandpass filter unit 105 of this exemplary embodiment, the passband is set roughly to between approximately 100 Hz and 1 kHz. This frequency bandwidth is a region where the first formant of normal speech is present, and is a component that has a considerable effect on speech recognition processing. Note that because the input signal X has already undergone frequency conversion, the processing performed by the bandpass filter unit 105 is only to extract the required bandwidth components (i.e., passband components).

In the mixing level calculation unit 106, an appropriate mixing level for when the mixing signal extracted by the bandpass filter unit 105 is mixed with the area sound collection output Z is calculated. In the mixing level calculation unit 106, a difference between both components of the suppressed frequency bandwidths is calculated from the input signal X and the area sound acquisition output Z, and the mixing level is determined within a range that enables this difference to be buried without exceeding the components of the original signal at the maximum level. The calculation of the appropriate level by the mixing level calculation unit 106 is preferably completed in advance in accordance with the characteristics of the speech recognition device 20 connected to a downstream stage.

The signal mixing unit 107 mixes the mixing signal, which is the output from the bandpass filter unit 105, with the area sound acquisition output Z in accordance with the mixing level calculated by the mixing level calculation unit 106, and then outputs the result. Hereinafter, the signal output by the signal mixing unit 107 is referred to as an 'output signal W'.

Here, as an example, processing by the mixing level calculation unit 106 to determine the mixing level for an optional frequency k1 of a passband will be described. Here, the power of the frequency k1 in the input signal X is taken as $X_{k1}$, the power of the frequency k1 in the area sound acquisition output Z is taken as $Z_{k1}$, and the mixing level of the frequency k1 is taken as $LM_{k1}$. In this case, $LM_{k1}$ may be set to a power not more than the differential between $X_{k1}$ and $Z_{k1}$ ($X_{k1}-Z_{k1} \geq LM_{k1}$). For example, $LM_{k1}$ may be set to a value ($LM_{k1}=(X_{k1}-Z_{k1}) \cdot a$) obtained by multiplying a coefficient a ($0<a\leq 1$) by the differential between $X_{k1}$ and $Z_{k1}$ ($X_{k1}-Z_{k1}$). In the mixing level calculation unit 106, the above-described processing is executed for each frequency in the passband.

Next, the signal mixing unit 107 corrects the level of the components of the frequency k1 in the mixing signal to a level that corresponds to $LM_{k1}$, and mixes the power of the frequency k1 in the area sound acquisition output Z with $Z_{k1}$. The above-described processing is executed in the signal mixing unit 107 for each frequency of the passband. Here, the mixing level is determined for each frequency on the passband, however, it is instead possible to calculate average amplitudes for each input signal X and area sound acquisition output Z over the entire passband, and then determine the mixing level collectively for the passband based on the difference between these average amplitudes.

Note that the mixing level calculation unit 106 is not necessarily an essential component element, and it is also possible for the mixing signal, which is the output from the bandpass filter unit 105, to be subtracted by a fixed proportion (for example, subtracted by approximately −6 dB), and then mixed with the area sound acquisition output Z.

The corrected output signal W is then converted into a time signal by the frequency/time conversion unit 108, and is then supplied to the speech recognition device 20. Hereinafter, a signal output by the frequency/time conversion unit 108 (i.e., a signal obtained when the output signal W is converted into a time region) is taken as an 'output signal w'.

(A-3) Effects of the First Exemplary Embodiment

According to the first exemplary embodiment, the following effects are demonstrated.

In the sound acquisition device 10 of the first exemplary embodiment, components of a frequency bandwidth suppressed by the area sound acquisition processing are corrected and restored by mixing these suppressed frequency bandwidth components extracted from the input signal X with the area sound acquisition output signal. In other words, in the sound acquisition device 10 of the first exemplary embodiment, components of a low frequency bandwidth that has been suppressed by the area sound acquisition processing are extracted from the input signal through a bandpass filter, and are then restored by being mixed with the area sound collection output. As a result, by combining the effects obtained from the sound acquisition device 10 of the first exemplary embodiment with the background noise suppression effect obtained from the area sound acquisition processing, superior speech recognition accuracy can be achieved.

(B) Second Exemplary Embodiment

Hereinafter, a second exemplary embodiment of the sound acquisition device, program, and method according to the present disclosure will be described in detail with reference to the drawings.

(B-1) Structure of the Second Exemplary Embodiment

Figure 3:
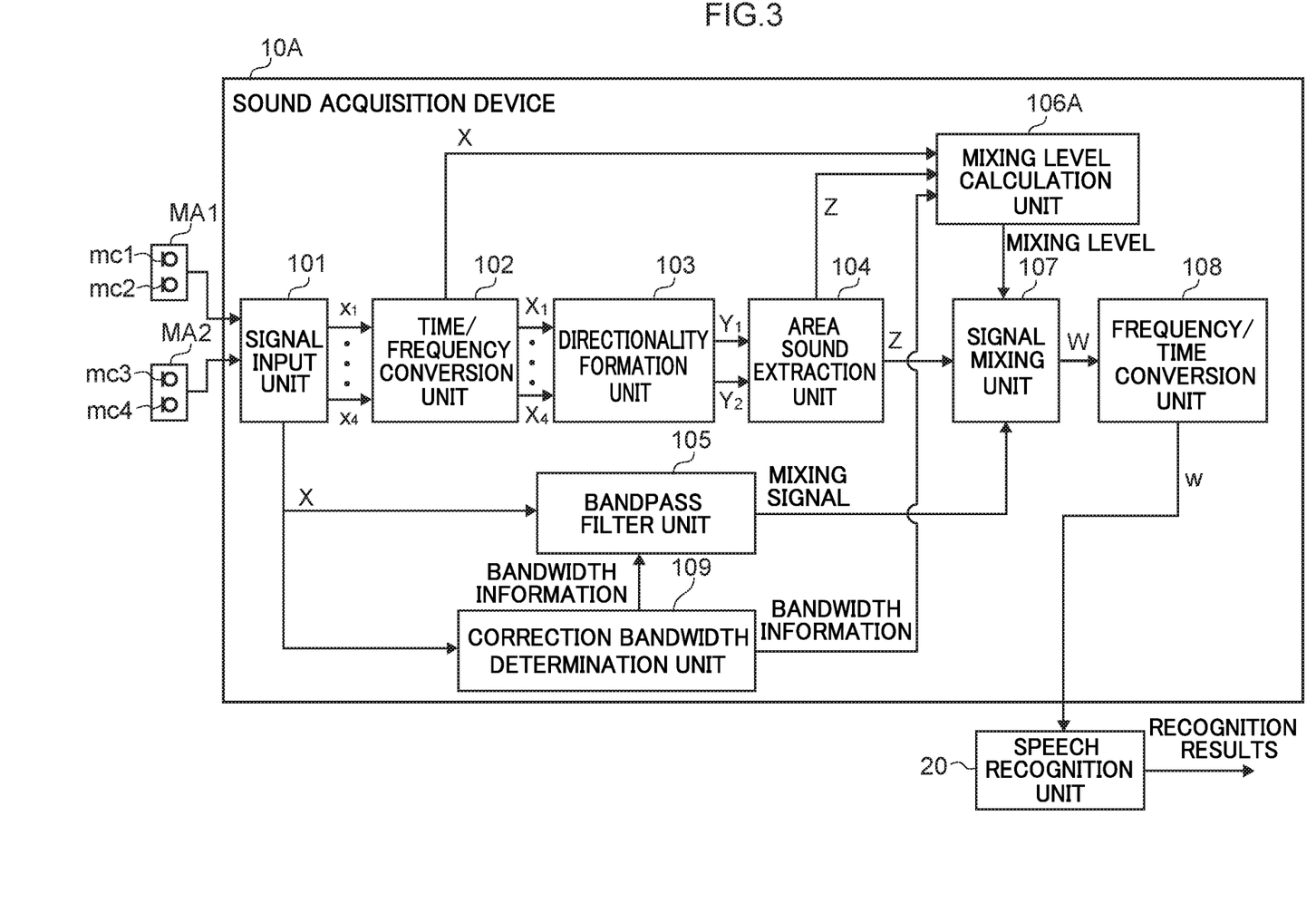
FIG. 3 is a block diagram showing a connection structure of each device and a functional structure of a sound acquisition device according to a second exemplary embodiment.

FIG. 3 is a block diagram showing a functional structure according to a sound acquisition device 10A of a second exemplary embodiment. Note that portions that are the same as, or that correspond to portions in the above-described FIG. 1 are given the same or corresponding symbols.

Points where the second exemplary embodiment differs from the first exemplary embodiment will now be described.

Note that the hardware structure of the sound acquisition device 10A of the second exemplary embodiment can also be illustrated using the above-described FIG. 2.

The sound acquisition device 10A of the second exemplary embodiment differs from the sound acquisition device 10 of the first exemplary embodiment in that the mixing level calculation unit 106 is replaced with a mixing level calculation unit 106A, and a correction bandwidth determination unit 109 has been added.

The sound acquisition device 10A of the second exemplary embodiment has a restoration device that restores components of speech (i.e., target area sound) that have been attenuated by the target area sound extraction processing, and this restoration device is formed by the bandpass filter 105, the mixing level calculation unit 106A, and the signal mixing unit 107.

(B-2) Operation of the Second Exemplary Embodiment

Next, an operation (i.e., a sound acquisition method according to the exemplary embodiments) of the sound acquisition device 10A of the second exemplary embodiment which has the above-described structure will be described centering on points of variance from the first exemplary embodiment.

In the second exemplary embodiment, because only the mixing level calculation unit 106A and the correction bandwidth determination unit 109 are different from the first exemplary embodiment, the following description will concentrate on operations of the mixing level calculation unit 106A and the correction bandwidth determination unit 109.

In the sound acquisition device 10 of the first exemplary embodiment, the frequency bandwidth corrected by the signal mixing in the area sound acquisition output Z is a fixed bandwidth. In contrast to this, the second exemplary embodiment differs from the first exemplary embodiment in that the frequency bandwidth corrected in the area sound acquisition output Z is decided adaptively (i.e., dynamically) in accordance with the characteristics of the input signal.

In the area sound acquisition processing (i.e., the processing as far as the area sound extraction unit 104), because unnecessary noise generated outside the target area is suppressed, it is desired to avoid mixing the input signal more than necessary.

Therefore, in this exemplary embodiment, processing resembling formant tracking is performed with the aim of retaining components of the first formant that have an important meaning to the speech recognition in the output signal w. It is not an easy task to detect and track formant frequencies from speech that has been acquired in a noisy environment.

Because of this, in the sound acquisition device 10A of this exemplary embodiment, instead of explicitly calculating formant frequencies in speech contained in an input signal, a frequency bandwidth having a predetermined range that has a high probability of containing a formant frequency is selected as the correction bandwidth. More specifically, in the sound acquisition device 10A of this exemplary embodiment, a maximum value of the frequency components is detected from a low frequency band range that has been suppressed by the area sound acquisition processing performed on an input signal, and a frequency bandwidth having a predetermined range that is centered on the detected frequency (for example, of a frequency bandwidth 200 to 300 Hz centering on the detected frequency) is taken as the correction bandwidth. Because the speech amplitude spectrum is a narrow-line spectrum, in order to stably extract the maximum value, it is preferable for the amplitude spectrum to be smoothed on the frequency axis prior to the maximum value being retrieved.

The correction bandwidth determination unit 109 decides the correction bandwidth from the input signal X by performing the above-described processing. Next, the correction bandwidth determination unit 109 supplies information concerning the determined correction bandwidth (hereinafter, referred to as 'bandwidth information') to the bandpass filter unit 105. Note that, when determining the correction bandwidth, the correction bandwidth determination unit 109 may also perform linear predictive coding (LPC) analysis from the input signal x of the time region, and then detect the peak frequency of the LPC spectrum envelope.

In accordance with the supplied bandwidth information (i.e., information about the correction bandwidth), the bandpass filter unit 105 extracts components of the correction bandwidth from the input signal X and uses these as the mixing signal. The bandwidth information determined by the correction bandwidth determination unit 109 is then supplied to the mixing level calculation unit 106A.

The mixing level calculation unit 106 calculates a difference between both components of the suppressed frequency bandwidths from the input signal X and the area sound acquisition output Z, and in order to correct the difference, the mixing level is determined within a range that does not exceed the components of the original signal at most.

The signal mixing unit 107 mixes the mixing signal, which is determined in the manner described above, with the area sound acquisition output Z in accordance with the mixing level determined by the mixing level calculation unit.

(B-3) Effects of the Second Exemplary Embodiment

According to the second exemplary embodiment, the following effects are demonstrated in addition to the effects demonstrated by the first exemplary embodiment.

In the sound acquisition device 10A of the second exemplary embodiment, because the bandwidth to be corrected (i.e., the bandwidth from which a mixing signal is to be extracted and then remixed) is determined in accordance with an input signal (for example, in accordance with the maximum amplitude frequency of the input signal) from the range of a low frequency bandwidth that has been suppressed by the area sound acquisition processing, it is possible to effectively correct and emphasize only those components of the input signal that are important for speech recognition.

(C) Third Exemplary Embodiment

Hereinafter, a third exemplary embodiment of the sound acquisition device, program, and method according to the present disclosure will be described in detail with reference to the drawings.

(C-1) Structure of the Third Exemplary Embodiment

Figure 4:
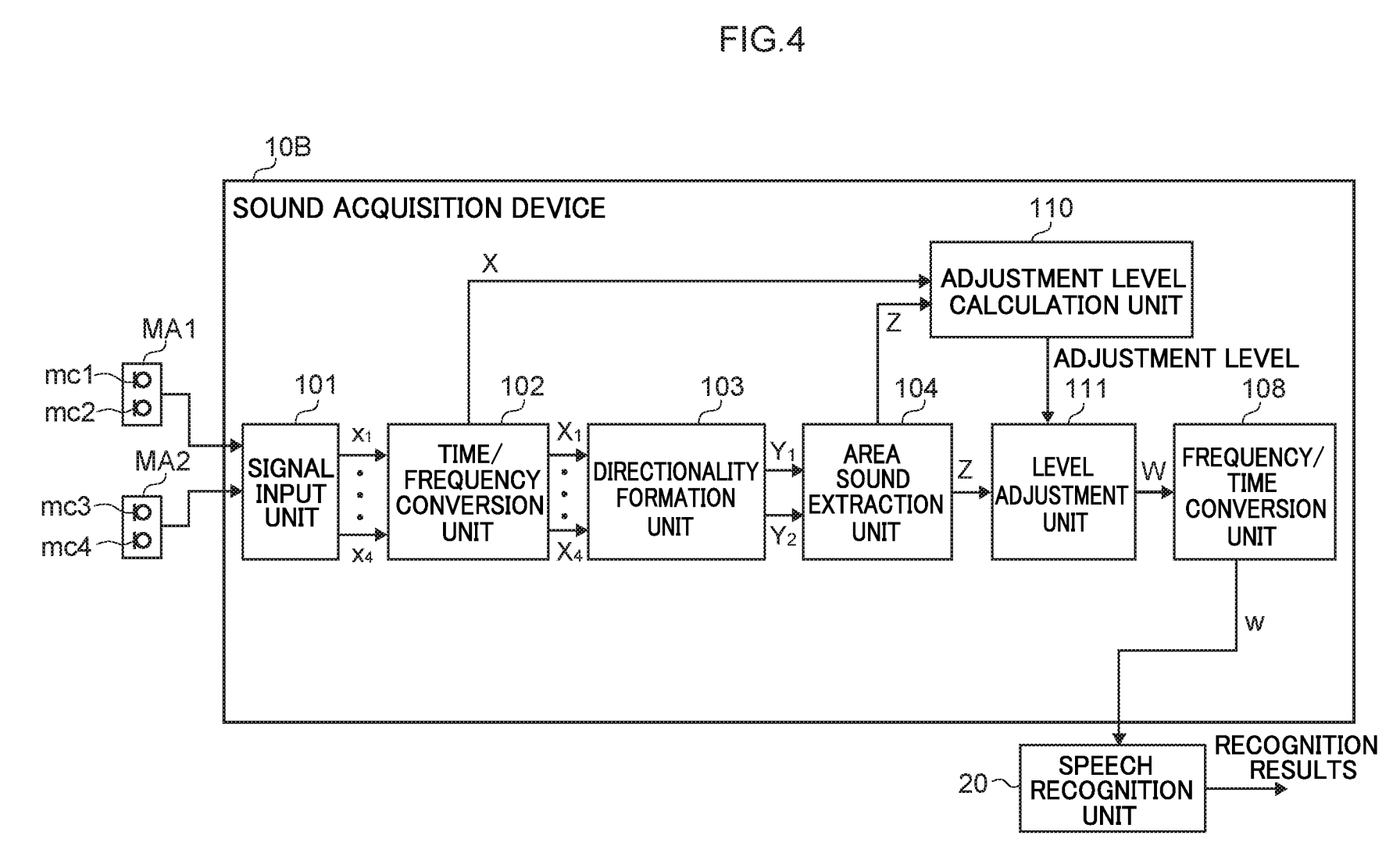
FIG. 4 is a block diagram showing a connection structure of each device and a functional structure of a sound acquisition device according to a third exemplary embodiment.

FIG. 4 is a block diagram showing a functional structure according to a sound acquisition device 10B of a third exemplary embodiment. Note that portions that are the same as, or that correspond to portions in the above-described FIG. 1 are given the same or corresponding symbols.

Note that the hardware structure of the sound acquisition device 10B of the third exemplary embodiment can also be illustrated using the above-described FIG. 2.

The sound acquisition device 10B of the third exemplary embodiment has the signal input unit 101, the time/frequency conversion unit 102, the directionality formation unit 103, the area sound extraction unit 104, the frequency/time conversion unit 108, an adjustment level calculation unit 110, and a level adjustment unit 111.

The sound acquisition device 10B of the third exemplary embodiment has a restoration device that restores components of speech (i.e., target area sound) that have been attenuated by the target area sound extraction processing, and this restoration device is formed by the adjustment level calculation unit 110 and the level adjustment unit 111.

(C-2) Operation of the Third Exemplary Embodiment

Next, an operation (i.e., a sound acquisition method according to the exemplary embodiments) of the sound acquisition unit 10C of the third exemplary embodiment which has the above-described structure will be described.

In the second exemplary embodiment, because operations of the signal input unit 101, the time/frequency conversion unit 102, the directionality formation unit 103, the area sound extraction unit 104, and the frequency/time conversion unit 108 are the same as in the first exemplary embodiment, a detailed description thereof will be omitted.

The sound acquisition device 10B of the third exemplary embodiment differs from the sound acquisition device 10 of the first exemplary embodiment in that the correction of frequency bandwidths suppressed by the area sound acquisition is achieved by performing boosting (i.e., to adjust the level of) suppressed frequency bandwidth components, instead of by mixing input signal components. Because the input signal is a signal obtained prior to the area sound acquisition processing, interference noise components generated outside the target area are contained in the input signal. Therefore, in the sound acquisition device 10B of the third exemplary embodiment, the level of frequency components of the area sound acquisition output signal Z itself (i.e., of a signal that does not contain interference noise components generated outside the target area) is adjusted in the level adjustment unit 111.

In the same way as in the first exemplary embodiment, the frequency bandwidth whose level is to be adjusted (hereinafter, referred to as an 'adjustment bandwidth') by the level adjustment unit 111 may be fixed to roughly between approximately 100 Hz and 1 kHz, which is the frequency bandwidth suppressed by the area sound acquisition processing, or as in the second exemplary embodiment, may be set adaptively in accordance with the input signal. In the level adjustment unit 111 of the third exemplary embodiment, in the same way as in the first exemplary embodiment, a description is given of when the frequency bandwidth to be corrected is a fixed frequency bandwidth.

The adjustment level calculation unit 110 calculates a difference between both components of the suppressed frequency bandwidths from the input signal X and the area sound acquisition output Z, and determines an adjustment level (i.e., a boost level) which is within a range that enables this difference to be buried without exceeding the components of the original signal at the maximum level.

The level adjustment unit 111 corrects and restores frequency characteristics by performing level adjustment (i.e., boosting) on suppressed low frequency bandwidth components from the area sound acquisition output signal Z in accordance with the adjustment level determined by the adjustment level calculation unit 110.

Here, as an example, processing performed by the adjustment level calculation unit 110 to determine an adjustment level for the optional frequency k1 of the adjustment bandwidth will be described. Here, the power of the frequency k1 in the input signal X is taken as $X_{k1}$, the power of the frequency k1 in the area sound acquisition output Z is taken as $Z_{k1}$, and the adjustment level of the frequency k1 is taken as $LT_{k1}$. In this case, $LT_{k1}$ may be set to a power not more than the differential between $X_{k1}$ and $Z_{k1}$ ($X_{k1}-Z_{k1} \leq LT_{k1}$). For example, $LT_{k1}$ may be set to a value ($LT_{k1}=(X_{k1}-Z_{k1}) \cdot a$) obtained by multiplying a coefficient a ($0 < a \leq 1$) by the differential between $X_{k1}$ and $Z_{k1}$ ($X_{k1}-Z_{k1}$). In the adjustment level calculation unit 110, the above-described processing is executed for each frequency in the adjustment bandwidth.

Next, if the mixing level calculated by the adjustment level calculation unit 110 for the frequency k1 is $LM_{k1}$, then the level adjustment unit 111 performs sufficient boosting so that the level of the component $Z_{k1}$ of the frequency k1 in the area sound acquisition output signal Z corresponds to the level of $LT_{k1}$. In the level adjustment unit 111, the above-described processing is executed for each frequency in the adjustment bandwidth.

(C-3) Effects of the Third Exemplary Embodiment

According to the third exemplary embodiment, the following effects are demonstrated.

In the sound acquisition device 10B of the third exemplary embodiment, components of frequency bandwidths suppressed by the area sound acquisition processing are corrected and restored by boosting these frequency bandwidth components in the area sound acquisition output signal Z. In other words, in the sound acquisition device 10B of the third exemplary embodiment, low frequency bandwidths suppressed by the area sound acquisition processing are corrected by boosting these frequency bandwidths in the area sound acquisition output signal Z. As a result, in the sound acquisition device 10B of the third exemplary embodiment, by combining the effects obtained from the sound acquisition device 10B of the third exemplary embodiment with the background noise suppression effect obtained from the area sound acquisition processing, superior speech recognition accuracy can be achieved.

Moreover, in the sound acquisition device 10B of the third exemplary embodiment, because the area sound acquisition output signal Z that does not contain interference noise components generated outside the target area is used as a base for correcting the frequency characteristics, the superior effect is obtained that there is little effect from interference noise.

(D) Fourth Exemplary Embodiment

Hereinafter, a fourth exemplary embodiment of the sound acquisition device, program, and method according to the present disclosure will be described in detail with reference to the drawings.

(D-1) Structure of the Fourth Exemplary Embodiment

Figure 5:
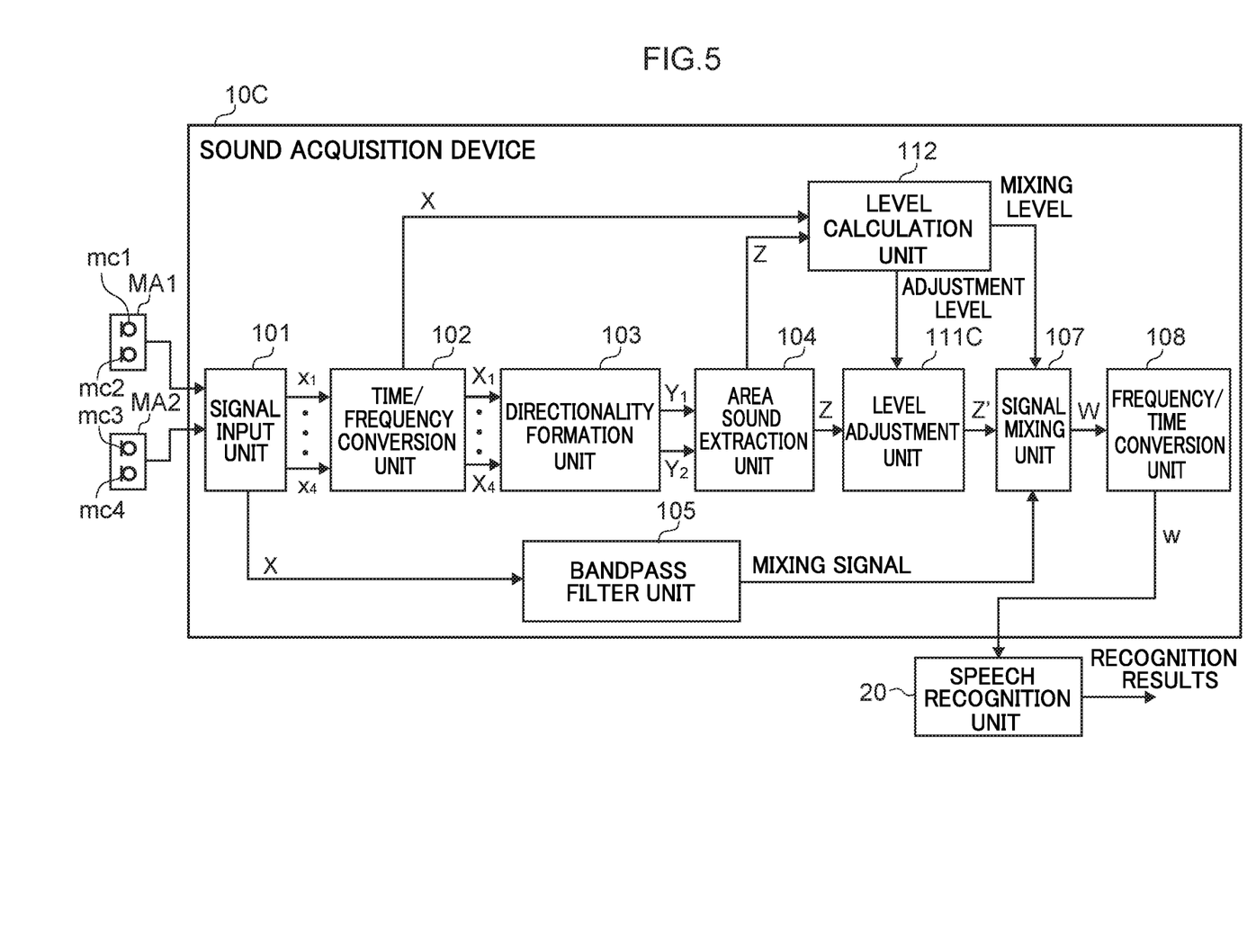
FIG. 5 is a block diagram showing a connection structure of each device and a functional structure of a sound acquisition device according to fourth exemplary embodiment.

FIG. 5 is a block diagram showing a functional structure according to a sound acquisition device 10C of a fourth exemplary embodiment. Note that portions that are the same as, or that correspond to portions in the above-described FIG. 1 are given the same or corresponding symbols.

Note that the hardware structure of the sound acquisition device 10C of the fourth exemplary embodiment can also be illustrated using the above-described FIG. 2.

The sound acquisition device 10C of the fourth exemplary embodiment has the signal input unit 101, the time/frequency conversion unit 102, the directionality formation unit 103, the area sound extraction unit 104, the bandpass filter unit 105, the signal mixing unit 107, the frequency/time conversion unit 108, a level calculation unit 112, and a level adjustment unit 111C.

The sound acquisition device 10C of the fourth exemplary embodiment has a restoration device that restores components of speech (i.e., target area sound) that have been attenuated by the target area sound extraction processing, and this restoration device is formed by the bandpass filter unit 105, the level calculation unit 112, and the level adjustment unit 111C.

(D-2) Operation of the Fourth Exemplary Embodiment

Next, an operation (i.e., a sound acquisition method according to the exemplary embodiments) of the sound acquisition device 10C of the fourth exemplary embodiment which has the above-described structure will be described.

Because operations of the signal input unit 101, the time/frequency conversion unit 102, the directionality formation unit 103, the area sound extraction unit 104, the bandpass filter unit 105, and the frequency/time conversion unit 108 are the same as in the first exemplary embodiment, a detailed description thereof will be omitted.

In the sound acquisition device 10 of the first exemplary embodiment, and the sound acquisition device 10A of the second exemplary embodiment, components of frequency bandwidths suppressed by the area sound acquisition processing are extracted from an input signal, and are then mixed with an area sound acquisition output signal, thereby enabling the suppressed bandwidth components to be corrected and restored. Additionally, in the sound acquisition device 10B of the third exemplary embodiment, suppressed bandwidth components are corrected and restored by boosting the area sound acquisition output. When mixing an input signal, there is a possibility that interference noise generated outside a target area will also be mixed in, and there has always been a possibility that components that should be emphasized and restored right from the start due to the suppression of low frequency bandwidths in the area sound collection processing will be lost in the boosting of the area sound acquisition output. Both methods have advantages and disadvantages, and choosing either one of these methods to perform a restoral carries a risk.

For this reason, in the sound acquisition device 10C of the fourth exemplary embodiment, instead of aiming to perform a restoral using just one of these methods, more stable correction and restoral of suppressed components are performed by combining both 'mixing of bandwidth components of an input signal' (i.e., the processing of the first exemplary embodiment) and 'boosting the area sound acquisition output Z' (i.e., the processing of the third exemplary embodiment).

The bandpass filter unit 105 performs bandpass filter processing to extract as a mixing signal the components of low frequency bandwidths suppressed by the area sound acquisition processing from an input signal that has undergone frequency conversion.

The level calculation unit 112 calculates an amount of attenuation of the low frequency bandwidth as a result of the area sound acquisition processing from the input signal X and the area sound acquisition output Z, and based on the size of this attenuation amount, calculates an adjustment level (i.e., a boost level for the area sound acquisition output Z in the level adjustment unit 111C), and a mixing level (i.e., a mixing level for the mixing signal in the signal mixing unit 107). In the level calculation unit 112, what proportion of the processing should be occupied respectively by the boosting of the area sound acquisition output and by the mixing of the mixing signal is preferably determined in accordance with the characteristics of the speech recognition system being used.

In accordance with the adjustment level decided by the level calculation unit 112, the level adjustment unit 111C corrects and restores frequency characteristics using level adjustment (i.e., boosting) for the components of low frequency bandwidths suppressed in the area sound acquisition output Z. In the fourth exemplary embodiment, the signals of the area sound acquisition output Z whose level has been adjusted (i.e., boosted) by the level adjustment unit 111C are referred to as 'area sound acquisition output Z'').

The signal mixing unit 107 mixes the mixing signal, which is the output from the bandpass filter unit 105, with the area sound acquisition output Z' in accordance with the mixing level calculated by the mixing level calculation unit 106, and then outputs the result. In the fourth exemplary embodiment, the signal output by the signal mixing unit 107 is referred to as an 'output signal W'.

Here, as an example, processing performed by the level calculation unit 112 to determine an adjustment level and a mixing level for the optional frequency k1 of the adjustment bandwidth/passband will be described. Note that a case in which the adjustment bandwidth and the passband are set to the same range (for example, both are set to a range between approximately 100 Hz and 1 kHz) is described. Here, the power of the frequency k1 in the input signal X is taken as $X_{k1}$, the power of the frequency k1 in an area sound acquisition output Zc is taken as $Z_{k1}$, the mixing level of the frequency k1 is taken as $LM_{k1}$, and the adjustment level of the frequency k1 is taken as $LT_{k1}$. In this case, the level calculation unit 112 may set a sum value of $LM_{k1}$ and $LT_{k1}$ (i.e., $LM_{k1}+LT_{k1}$) to a power not more than the differential between $X_{k1}$ and $Z_{k1}$ (i.e., $X_{k1}-Z_{k1} \geq LM_{k1}+LT_{k1}$). For example, the sum value of $LM_{k1}$ and $LT_{k1}$ (i.e., $LM_{k1}+LT_{k1}$) may be set to a value ($LM_{k1}+LT_{k1}=(X_{k1}-Z_{k1})\cdot a$) obtained by multiplying a coefficient a ($0<a \leq 1$) by the differential between $X_{k1}$ and $Z_{k1}$ (i.e., $X_{k1}-Z_{k1}$). In the level calculation unit 112, the above-described processing is executed for each frequency in the passband/adjustment bandwidth. Moreover, as is described above, what proportion of the processing by the level calculation unit 112 should be performed respectively for the adjustment level $LT_{k1}$ and for the mixing level $LM_{k1}$ is not restricted, and is preferably determined in accordance with the characteristics of the speech recognition system being used.

(D-3) Effects of the Fourth Exemplary Embodiment

According to the fourth exemplary embodiment, the following effects are demonstrated.

In the sound acquisition device 10C of the fourth exemplary embodiment, as a third aspect, correction and restoral of a low frequency bandwidth that has been suppressed by area sound acquisition processing are achieved by combining both mixing processing of an input signal (i.e., the processing of the first exemplary embodiment), and processing to boost the area sound acquisition output (i.e., the processing of the third exemplary embodiment). As a consequence, in the sound acquisition device 10C of the fourth exemplary embodiment, more stable correction and restoral are achieved than in either the first or third exemplary embodiments, so that, as a result, superior speech recognition accuracy can be achieved.

(E) Other Exemplary Embodiments

The present disclosure is not limited to the above-described respective embodiments, and may include variant exemplary embodiments such as those illustrated below.

(E-1) In each of the above-described exemplary embodiments, the sound acquisition device and the speech recognition device are described as being mutually independent devices, however, it is possible for these to instead be formed by a single device (for example, by being integrated in a single computer).

(E-2) In the sound acquisition device 10A of the second exemplary embodiment, the bandwidth in which mixing signals are extracted from a low frequency bandwidth range that has been suppressed by area sound acquisition processing and are then mixed (i.e., the bandwidth that is to be corrected) is determined dynamically in accordance with an input signal, however, in the same way as in the third exemplary embodiment, it is also possible to set the bandwidth that is to be subjected to level adjustment (i.e., the bandwidth to be corrected) dynamically in accordance with an input signal. In other words, in the third exemplary embodiment as well, there may also be provided a correction bandwidth determination unit that adaptively determines the bandwidth that is to be subjected to level adjustment (i.e., the bandwidth to be corrected) in accordance with an input signal.

(E-3) In the fourth exemplary embodiment, the area sound acquisition output Z is corrected in sequence firstly by the level adjustment unit 111C, and then by the signal mixing unit 107, however, this sequence of firstly the level adjustment unit 111C, and then the signal mixing unit 107 may also be inverted.

What is claimed is:

1. A sound acquisition device comprising:
   a target area sound extraction unit that, based on input signals input from a plurality of microphone arrays, acquires beam former outputs from each of the microphone arrays,
      converts the beam former outputs from time domain signals to frequency domain signals, and
      uses the acquired beam former outputs to perform target area sound extraction processing to extract a target area sound taking a target area as a sound source, so as to thereby acquire an area sound acquisition output as the frequency domain signals in which amplitude levels of a predetermined frequency range have been suppressed during the target area sound extraction processing; and
   a restoration device that restores the amplitude levels of the area sound acquisition output in the predetermined frequency range of the target area sound so as to be closer to the input signals obtained from the microphone arrays.

2. The sound acquisition device according to claim 1, wherein the restoration device has:
   a bandpass filter unit that passes, as a mixing signal from the input signals, a signal having the predetermined frequency range in a pass band; and
   a signal mixing unit that mixes the mixing signal together with the area sound acquisition output.

3. The sound acquisition device according to claim 2, wherein:
   the restoration device includes a mixing level calculator that, for each frequency, calculates a mixing level for the signal mixing unit for mixing the mixing signal together with the area sound acquisition output based on differences between amplitude levels of the input signals and the amplitude levels of the area sound acquisition output, and
   the signal mixing unit corrects the mixing signal for each frequency to the mixing level calculated by the mixing level calculator, and then mixes the result together with the area sound acquisition output.

4. The sound acquisition device according to claim 3, wherein the restoration device further includes a correction bandwidth determination unit that adaptively determines, from the input signals, the passband of the bandpass filter unit.

5. The sound acquisition device according to claim 3, wherein:
   the target area sound includes speech emitted by a person, and
   the restoration device includes a correction bandwidth determination unit that calculates an estimated formant frequency that corresponds to a first formant of the speech from the input signals, and determines a corrected frequency range containing the calculated estimated formant frequency and having a narrower range than the predetermined frequency range, as the passband of the bandpass filter unit.

6. The sound acquisition device according to claim 1, wherein the restoration device includes a level adjustment unit that adjusts the amplitude levels of the area sound acquisition output in the predetermined frequency range.

7. The sound acquisition device according to claim 6, wherein:
   the restoration device further includes an adjustment level calculation unit that calculates an adjustment level for the level adjustment unit for adjusting the amplitude levels of the area sound acquisition output based on differences between amplitude levels of the input signals and of the area sound acquisition output, and
   the level adjustment unit corrects the amplitude levels of the area sound acquisition output to the adjustment level calculated by the adjustment level calculation unit.

8. The sound acquisition device according to claim 6, wherein the restoration device further includes a correction bandwidth determination unit that adaptively determines, from the input signals, a corrected frequency range, and
   the level adjustment unit corrects the amplitude levels of the area sound acquisition output in the corrected frequency range.

9. The sound acquisition device according to claim 1, wherein the restoration device has:

a bandpass filter unit that passes, as a mixing signal from the input signals, a signal having a predetermined frequency range in a pass band of the bandpass filter;

a level adjustment unit that adjusts the amplitude levels of the area sound acquisition output in the predetermined frequency range; and a signal mixing unit that mixes the mixing signal together with the area sound acquisition output whose amplitude levels have already been adjusted by the level adjustment unit.

10. The sound acquisition device according to claim 1, wherein the restoration device has:

a bandpass filter unit that passes, as a mixing signal from the input signals, a signal having a predetermined frequency range in a pass band of the bandpass filter;

a signal mixing unit that mixes the mixing signal together with the area sound acquisition output; and a level adjustment unit that adjusts the amplitude levels of the area sound acquisition output in the predetermined frequency range after the mixing signal has already been mixed by the signal mixing unit.

11. A non-transitory computer-readable storage medium storing a sound acquisition program that is executable by a computer to function as:

a target area sound extraction unit that, based on input signals input from plural microphone arrays, acquires beam former outputs from each of the microphone arrays, converts the beam former outputs from time domain signals to frequency domain signals, and uses the acquired beam former outputs to perform target area sound extraction processing to extract a target area sound taking a target area as a sound source, so as to thereby acquire an area sound acquisition output as the frequency domain signals in which amplitude levels of a predetermined frequency range were suppressed during the target area sound extraction processing; and a restoration device that restores the amplitude levels of the area sound acquisition output in the predetermined frequency range of the target area sound so as to be closer to the input signals obtained from the microphone arrays.

12. A sound acquisition method performed by a sound acquisition device having a target area sound extraction unit and a restoration device, the method comprising:

based on input signals input from plural microphone arrays, the target area sound extraction unit, acquiring beam former outputs from each of the microphone arrays, converting the beam former outputs from time domain signals to frequency domain signals, and using the acquired beam former outputs to perform target area sound extraction processing to extract a target area sound taking a target area as a sound source, so as to thereby acquire an area sound acquisition output as the frequency domain signals in which amplitude levels of a predetermined frequency range have been suppressed during the target area sound extraction processing; and the restoration device restoring the amplitude levels of the area sound acquisition output in the predetermined frequency range of the target area sound so as to be closer to the input signals obtained from the microphone arrays.

\* \* \* \* \*